United States Patent [19]

Kessler et al.

[11] Patent Number: 5,562,587

[45] Date of Patent: Oct. 8, 1996

[54] TREATMENT METHOD FOR URBAN WASTE INCINERATION RESIDUES AND PRODUCTS THUS OBTAINED

[75] Inventors: Benoît Kessler, Montelimar; Jean-Pierre Letourneux, Villefontaine; Michel Testud, Genas; Bernard Robin, Valvigneres, all of France

[73] Assignee: Lafarge Aluminates, Paris, France

[21] Appl. No.: 120,672

[22] Filed: Sep. 13, 1993

[30] Foreign Application Priority Data

Sep. 14, 1992 [FR] France ................................. 92 10923

[51] Int. Cl.⁶ ...................................................... A62D 3/00
[52] U.S. Cl. ......................... 588/256; 106/705; 405/263; 588/252
[58] Field of Search .................................. 588/252, 249, 588/256, 257; 405/128, 263, 264; 106/718, 719, 697, 694

[56] References Cited

U.S. PATENT DOCUMENTS

| | | |
|---|---|---|
| 3,170,677 | 2/1965 | Phister et al. . |
| 4,209,335 | 6/1980 | Katayama et al. . |
| 5,177,305 | 1/1993 | Pichat ................... 588/252 X |
| 5,252,127 | 10/1993 | Pichat ................... 588/252 X |
| 5,347,077 | 9/1994 | Hooykaas et al. ......... 588/252 X |
| 5,349,118 | 9/1994 | Davidovits .............. 588/252 |
| 5,376,283 | 12/1994 | Hooykaas ............... 588/252 X |
| 5,387,739 | 2/1995 | Pichat ................... 588/252 X |

FOREIGN PATENT DOCUMENTS

| | | |
|---|---|---|
| 3600644 | 7/1987 | Germany . |
| 0730654 | 4/1980 | U.S.S.R. ................ 588/252 |
| 2224024 | 4/1990 | United Kingdom . |

OTHER PUBLICATIONS

Chemical Abstracts, vol. 84, No. 12, 22 Mar. 1976, Abstract No. 79355k, T. Okoda et al.
Chemical Abstracts, vol. 108, No. 24, Jun. 1988, Abstract No. 209179h, M. Sawaide et al.
Chemical Abstracts, vol. 113, No. 10, 3 Sep. 1990, Abstract No. 84241s, R. Bricka et al.
Chemical Abstracts, vol. 95, No. 26, 28 Dec. 1981, Abstract No. 224505t, Toa Doro Kogyo Co. Ltd.

*Primary Examiner*—Dennis L. Taylor
*Attorney, Agent, or Firm*—Curtis, Morris & Safford, P.C.

[57] ABSTRACT

The invention relates to a treatment method for urban waste incineration residues in a finely divided form, in which the residues to be treated are homogenized and their composition is subjected to a chemical analysis. Then, the residues are mixed with water and a reagent containing active alumina in proportions determined in relation to the chemical analysis of the residues, in order to generate complex aluminates, whereas active alumina is in excess.

20 Claims, No Drawings

TREATMENT METHOD FOR URBAN WASTE INCINERATION RESIDUES AND PRODUCTS THUS OBTAINED

This invention relates to a method for treating urban waste incineration residues as well as to the products obtained by the implementation of said process.

Urban waste is becoming larger and larger. It is usually incinerated and generates residues.

These residues are usually in the form of slags or fly ashes, derived from the purification of fumes.

These residues can only be stored after physical or chemical stabilisation of the numerous polluting substances they contain.

The purpose of the treatment method according to the invention is to improve the fixation of the polluting substances of the urban waste incineration residues. Preferably, it affects waste in a finely divided form.

Therefore, it mainly applies to the residues of fume purification, but can also apply to any other residue inasmuch as a preliminary treatment enables to present it in a finely divided form, either pulverulent or pasty, providing its chemical structure remains compatible with the proposed treatment.

It has been proposed for a long time to condition the residues of incineration fume while incorporating them to cement or to various compositions of hydraulic binding agents.

However, the incineration residues contain substances which interact with the hydraulic binding agents and disturb the hardening phenomena. The products obtained this way are fragile, liable to exhibit cracks or high porosity. The fixation of the polluting products shown is insufficient and the leaching phenomena remain quite significant.

It has also been proposed to condition the residues of waste incineration in at least two stabilisation stages: a first stage during which the residues are mixed with a hydraulic binding agent and, if needed, various reagents to trap environment-harmful elements chemically or physically, followed by a second stage, aiming at strengthening the effect of the hydraulic binding agent used during the first stage, which consists in arranging a barrier to counteract the leaching phenomena. As the case may be, this barrier can be obtained by embedding using a composition based on a hydraulic binding agent, such as Portland cement or an organic binding agent, such a stearate or bitumen.

Numerous special systems describing the two-stage conditioning of incineration waste have been proposed. Such a solution is described namely in Japanese patent application JP-61 0910050, in international application PCT-89/12498 and in German patent DE-3 808 187.

Japanese patent application JP-61 0910050 relates to a manufacturing method of aggregates or fillers for concrete, from incineration ashes.

According to this method, ashes are crushed, mixed with cement (approx. 40% in weight), and treated until the cement has hardened partially or completely. The concrete thus obtained is then crushed to particles which are mixed to cement again (approx. 40% in weight) and sand, possibly. After hardening, another reduction is carried by crushing, in order to obtain particles of a preset size, or granulates which will be used in the manufacture of concrete.

Such a solution is, however, not economical, since it comprises several crushing stages and requires large quantities of cement. It tends to solve setting as well as hardening problems mentioned above by diluting the waste into cement. Because of the crushing operations, the interactions between the hydraulic binding agent and the harmful elements for the setting and the hardening of the binding agent are favoured during the first as well as during the second stage. Therefore, it is not possible to obtain efficient stabilisation of all the waste in a dense structure.

According to the international application PCT 89/12498, the residues of waste incineration are combined to a treatment agent specific to heavy metals, such as diatom clay, which is preferably added with Portland cement. Granulates obtained are then coated using a cement-like composition. However, even in such a case, the elements harmful to the setting and the hardening present in the residues, such as the ions $Cl^-$, $SO_4^{--}$, ... may hinder hydration of the cement used to form the granulates and, consequently, the cement making the coating shell, at least around the shell in contact with the granulate. This leads to the absence of physical or chemical link between the granulate and the coating shell; the latter is thus made brittle and, in case of a shock, deformation or significant expansion, may break into little pieces.

The solution proposed by German patent DE-3 808 187 consists in crushing the waste, in exposing it to a lime-based treatment, then granulation under pressure, heat treatment and crushing. The mixture obtained is then mixed to cement, then granulated again. This is a complicated and expensive method.

None of the methods known to this date are totally satisfactory nor enable to obtain sufficient stabilisation at reasonable costs.

The purpose of this invention is to develop a treatment method for the urban waste incineration residues, which would ensure efficient stabilisation of most polluting elements and which can be implemented at reasonable costs.

To this end, the treatment method of the urban waste incineration residues, in a finely divided form, comprises the following stages:

a) homogenization of the residues to be treated;

b) chemical analysis of their composition, in order to know their content, at least, in calcium and soluble salts;

One must make sure that the products obtained after homogenization are compatible with the treatment proposed and, especially, that they do not contain any mineral nor organic substances in concentrations liable to disturb chemical reactions.

c) the residues are mixed to water and a reagent containing a mixture of active alumina and or compounds liable to release active alumina, and lime in proportions determined in relation to the chemical analysis of the residues in order to generate complex aluminates, whereas active alumina is in excess;

d) the mixture is left to set and to harden.

According to a preferred embodiment of the process of the invention, it also comprises the following additional stages:

e) crushing and screening of the solid obtained in order to produce a granulate;

f) mixing of the granulate to a binding agent, in order to form a solid, in which the granulate is embedded.

In order to simplify the expression of the formulations, the following abbreviated notations of the cement industry shall be used to indicate the calcium and aluminium compounds, such as $[CaO]_3[Al_2O_3]$, $[CaO]_{12}[Al_2O_3]_7$, $[CaO][Al_2O_3]_2$, $[CaO][Al_2O_3]$, $[CaO]_4[Al_2O_3][H_2O]_{13}$, $[CaO]_3[Al_2O_3][H_2O]_6$.

During the reaction produced from stage c) and during stage d), the active alumina reacts chemically with the components of the incineration residues and forms hydrated calcium aluminates which combine chemically and form compounds of reduced solubility with most polluting ions.

Active alumina is here an agent bringing the aluminium element, which reacts with calcium and soluble salts and produces aluminates. Active alumina is either brought directly or through one or several compounds liable to release it.

According to a preferred embodiment, the reagent contains $[CaO]_3$, $[Al_2O_3]$. The reactions observed, for instance with sulphates, are as follows:

$[CaO]_3[Al_2O_3]+3 (CaSO_4)+n Z[H_2O] \rightarrow [CaO]_3[Al_2O_3](CaSO_4)_3 \cdot 32 Z[H_2O]$ leading to the formation of ettringite or of hydrated calcium trisulfoaluminate ($n \geq 32$);

$[CaO]_3[Al_2O_3]+CaSO_4+n Z[H_2O] [CaO]_3[Al_2O_3] CaSO_4 \cdot 11 Z[H_2O]$ leading to the formation of hydrated calcium monosulfoaluminate ($n \geq 11$).

Analogous reactions can be obtained with the other anions, for instance with chlorides, carbonates and nitrates, leading, generally, to the formation of hydrates according to the following formulation:

$[CaO]_3[Al_2O_3] \cdot CaD' \cdot nH_2O$ or $[CaO]_3[Al_2O_3] \cdot CaE'2 \cdot nH_2O$ where D' and E' are anions, respectively di and monovalent.

Very good results can also be obtained when the reagent contains $[CaO]_{12}[Al_2O_3]_7$.

In this case, the previous reactions are balanced by replacing $[CaO]_{12}[Al_2O_3]$ by $[1/7 [CaO]_3[Al_2O_3]_7+9/7 C]$. The aluminates formed are thus the same as those obtained with $[CaO]_3[Al_2O_3]$.

Good results can also be obtained by using a $x_3y/[CaO]_{12}[Al_2O_3]_7$ mixture.

These reactions take place a room temperature (between 5° and 45° C. approx.). Good kinetics can be observed at a temperature less than 20° C.

They enable not only to trap anions, but also to stabilize certain cations.

Experience shows that very good results can be obtained while bringing active alumina by $[CaO]_3[Al_2O_3]$ only, but that the reaction then tends to be slowed down during its development, whereas aluminates form around the grains and tend to isolate them before they have had time to react.

Implementation of $[CaO]_{12}[Al_2O_3]_7$ enables to avoid this phenomenon. While reactions begin rapidly at the implementation of $[CaO]_3[Al_2O_3]$ then tend to slow down, they develop at a speed more uniform at the implementation of $[CaO]_{12}[Al_2O_3]_7$. A reagent which contains both $[CaO]_3[Al_2O_3]$ and $[CaO]_{12}[Al_2O_3]_7$, used to bring active alumina, gives the best results.

The quantities of reagents mixed to the incineration residues during stage c), as well as the quantity of water added, are optimized in relation to the results of the chemical analysis, the subject matter of stage b), and to the quality of treatment required.

The quantity of added water depends on the initial humidity of the residues. It is determined in order to obtain optimum consistency during mixing. Previous mixing of water and residues can improve the quality of the results.

Since the residues of the incineration of urban waste can exhibit quite a variable composition; they are homogenized in a first stage. Chemical analysis of their composition is then carried out, for instance by X-fluorescence. In case of doubt further to the chemical analysis, the performance of the treatment must be checked.

The quality of active alumina, for instance of a $([CaO]_3[Al_2O_3] [CaO]_{12}[Al_2O_3]_7)$ mixture used as a reagent, is determined in relation to the theoretical stoichiometric conditions of the reactions mentioned above.

Preferably, the reagent is introduced in excess and, for example, a weight excess comprised between 0 and 20% produces excellent results without being detrimental to the implementation costs of the method. The main thing is to obtain maximum fixation, if possible a complete one, of the soluble salts in the form of aluminates.

The domestic waste incineration residues comprise generally high lime content (the content of [CaO] is mostly comprised between 15 and 45%).

According to the quantity of lime initially present in the residues, additional input of lime into the reagent may improve the reactions.

Lime can be introduced in the form of quick lime or of dead lime. Advantageously, quick lime should be sintered.

It can also be introduced in the form of Portland cement, either standard one, or without $[CaO]_3[Al_2O_3]$.

The analysis of stage b) relates to the main soluble salts, and especially on chlorides, sulphates, carbonates, nitrates.

The chemical reactions mentioned above enable to obtain improved stabilisation and passivation of the soluble salts. Moreover, they allow significantly to reduce the solubility of heavy metals with the usual concentrations.

These metals can replace certain calcium ions during the formation of hydrates, sometimes causing the deformation of the crystal lattice.

They can also be encapsulated by these salts during their formation and/or be made highly insoluble in the form of hydroxide thanks to the basic pH of the medium.

The pH of the products obtained depends on the dosage of active alumina and of the lime during stage c). Good insolubilisation is obtained with a pH comprised between 10.5 and 12.

Indeed, the solubility of the metals depends to a large extent on the pH of the solution. This solubility can be minimized thanks to basic pH, i.e. over 7 by precipitation in the form of metal hydroxides.

It has been noted that a pH comprised between 10.5 and 12 enables to obtain efficient insolubilisation for copper, cadmium, zinc, silver, lead and ferrous salts.

Numerous aluminates can be used to provide the active alumina necessary to these reactions. For instance $[CaO][Al_2O_3]_2$, $[CaO][Al_2O_3]$, $[CaO]_{12}[Al_2O_3]_7$, $[CaO]_3[Al_2O_3]$, alkaline aluminates, aluminoferrites can be used.

Amongst calcium aluminates, those obtained by a sintering method are used preferably to those obtained by a fusion method. Indeed, calcium aluminates obtained by a sintering method can be crushed more easily and exhibit higher reactivity.

Hydrated calcium aluminates, such as $[CaO]_4[Al_2O_3](H_2O)_{13}$ can also lead to the formation of complex aluminates by exchanges of ions.

Aluminous cements, such as those designated commercially as FONDU, SECAR, LDSF, can be implemented, as well as the Cubique-T, which a cubic calcium aluminate, $[CaO]_3[Al_2O_3][H_2O]_6$ thermally decomposed at approx. 300° C. into $[CaO]_{12}[Al_2O_3]_7$ and $Ca(OH)_2$. This product directly presents the stoichiometry necessary to the formation of complex aluminates in case of a reaction with a calcium salt.

Once the residues have been mixed to water and the reagent, the mixture is left to set and harden, so that the reactions mentioned above take place to the fullest extent. 48 to 72 hours may be required to this end.

The result is a solid product.

It can be stored as such and, in most cases, enable to ensure better protection of the environment.

However, attention should be drawn to the wide variety of composition of the residues and to the fact that the treatment proposed is not versatile.

Still, its resistance to the attacks of the external agents released by the products obtained can be improved further by an additional coating.

In this view, for instance the crushing and the screening of the solid product obtained can be additionnaly prepared in order to obtain a granulate.

The polluting substances contained in this granulate have been treated during the first stages. Coating these granulates improves their resistance to leaching.

Sound fixation of the usual polluting substances enables to avoid their interaction with the coating substance, and various binding agents can then be implemented for the coating process.

Good results have been obtained with hydraulic binding agents and, for instance, Portland cement.

Indeed, the elements which could have reacted with the compounds of the Portland cement in order to slow down or prevent its setting, such as boron compounds, alkaline chlorides, acid salts, . . . have been inhibited highly and cannot interact any longer significantly with cement.

Moreover, no significant swellings have been observed, which could have been feared, taking into account the initial nature of the residues.

Furthermore, it is especially efficient to provide the granulates with a basic environment which contributes to their stabilisation and to the insolubilisation of heavy metals.

According to the subsequent usage contemplated for the products obtained, the former could be moulded, for instance to be shaped into parallelepipeds or spheres.

The granulate/binding agent mixture, before setting, is advantageously pressed and/or vibrated.

The invention also relates to the products obtained by implementation of the process described above.

More especially, in these products, the anions of soluble salts are, with a ratio of at least 40% bound chemically in the form of complex calcium aluminates.

In such products, heavy metals are, at the ratio of at least 50%, made insoluble in the form of hydroxide thanks to the high pH of the medium.

The following examples present the results of the leaching tests to the modified NF X 31-210 AFNOR standard, performed on products derived from the implementation of the invention method.

They mention the results of the chemical analysis of the incineration residues of certain types of French urban waste according to stage b) of the invention method, the composition of the reagent, the composition of the binding agent used for the coating method and the results of the leaching measurements.

Heavy metals have been analyzed by I.C.P. (Inductively Coupled Plasma).

EXAMPLE 1

Chemical analysis of the important elements of the residues (%):

| Cl | 17.6  | CaO | 42.4  | $SO_3$ | 3.8   |    |       |
|----|-------|-----|-------|--------|-------|----|-------|
| Zn | 0.510 | Pb  | 0.253 | Ni     | 0.027 | Cd | 0.011 |
| As | 0.002 | Hg  | 0.002 |        |       |    |       |

Reagent:
Quantity: 250 kg by ton of residues
Composition: $[CaO]_3[Al_2O_3]$: 20% $[CaO]_{12}[Al_2O_3]_7$: 80%
CaO: 0%
Coating binding agent (kg by ton of residues):
Portland cement: 470
Leaching results after 28 days' hardening:
Soluble fraction: 3.2% of the dry waste
Chloride: 8 g by kg of dry waste
Heavy metals and arsenic: less than the detection threshold of the instrument

EXAMPLE 2

Chemical analysis of the important elements of the residues (%):

| Cl | 10.5  | CaO | 19.3  | $SO_3$ | 8.2   |    |       |
|----|-------|-----|-------|--------|-------|----|-------|
| Zn | 2.450 | Pb  | 1.080 | Ni     | 0.012 | Cd | 0.074 |
| As | 0.006 | Hg  | 0.002 |        |       |    |       |

Reagent:
Quantity: 190 kg by ton of residues
Composition: $[CaO]_3[Al_2O_3]$: 21% $[CaO]_{12}[Al_2O_3]_7$: 79%
CaO: 0%
Coating binding agent (kg by ton of residues):
Portland cement: 280
Leaching results after 28 days' hardening:
Soluble fraction: 4.0% of the dry waste
Chloride: 5 g by kg of dry waste
Heavy metals and arsenic: less than the detection threshold of the instrument

EXAMPLE 3

Chemical analysis of the important elements of the residues (%):

| Cl | 10.2  | CaO | 16.2  | $SO_3$ | 16.1  |    |       |
|----|-------|-----|-------|--------|-------|----|-------|
| Zn | 2.413 | Pb  | 0.971 | Ni     | 0.012 | Cd | 0.005 |
| As | 0.004 | Hg  | 0.003 |        |       |    |       |

Reagent:
Quantity: 250 kg by ton of residues
Composition: $[CaO]_3[Al_2O_3]$: 16% $[CaO]_{12}[Al_2O_3]_7$: 84%
CaO: 0%
Coating binding agent (kg by ton of residues):
Portland cement: 400
Leaching results after 28 days' hardening:
Soluble fraction: 2.9% of the dry waste
Chloride: 4 g by kg of dry waste
Heavy metals and arsenic : less than the detection threshold of the instrument

EXAMPLE 4

Chemical analysis of the important elements of the residues (%):

| Cl | 14.7  | CaO | 37.6  | $SO_3$ | 4.7   |    |       |
|----|-------|-----|-------|--------|-------|----|-------|
| Zn | 0.790 | Pb  | 0.290 | Ni     | 0.012 | Cd | 0.013 |
| As | 0.002 | Hg  | 0.001 |        |       |    |       |

Reagent:
Quantity: 200 kg by ton of residues
Composition: $[CaO]_3[Al_2O_3]$: 15% $[CaO]_{12}[Al_2O_3]_7$: 85%
CaO: 0%

Coating binding agent (kg by ton of residues):
Portland cement: 360
Leaching results after 28 days' hardening:
Soluble fraction: 3.8% of the dry waste
Chloride: 5 g by kg of dry waste
Heavy metals and arsenic: less than the detection threshold of the instrument

EXAMPLE 5

Chemical analysis of the important elements of the residues (%):

| Cl | 12.6 | CaO | 15.4 | $SO_3$ | 12.9 | | |
|---|---|---|---|---|---|---|---|
| Zn | 3.650 | Pb | 1.700 | Ni | 0.016 | Cd | 0.074 |
| As | 0.004 | Hg | 0.002 | | | | |

Reagent:
Quantity: 310 kg by ton of residues
Composition: $[CaO]_3]Al_2O_3]$: 80% $[CaO]_{12}]Al_2O_3]_7$: 0% CaO: 20%
Coating binding agent (kg by ton of residues):
Portland cement: 410
Leaching results after 28 days' hardening:
Soluble fraction: 5.5% of the dry waste
Chloride: 9 g by kg of dry waste
Heavy metals and arsenic: less than the detection threshold of the instrument

EXAMPLE 6

Chemical analysis of the important elements of the residues (%):

| Cl | 10.1 | CaO | 23.7 | $SO_3$ | 6.35 | | |
|---|---|---|---|---|---|---|---|
| Zn | 1.055 | Pb | 0.575 | Ni | 0.006 | Cd | 0.021 |
| As | 0.003 | Hg | 0.002 | | | | |

Reagent:
Quantity: 200 kg by ton of residues
Composition: $[CaO]_3]Al_2O_3]$: 25% $[CaO]_{12}]Al_2O_3]_7$: 75% CaO: 0%
Coating binding agent (kg by ton of residues):
Portland cement: 400
Leaching results after 28days' hardening:
Soluble fraction: 1.2% of the dry waste
Chloride: 3 g by kg of dry waste
Heavy metals and arsenic: less than the detection threshold of the instrument

EXAMPLE 7

Chemical analysis of the important elements of the residues (%):

| Cl | 9.5 | CaO | 22.4 | $SO_3$ | 5.9 | | |
|---|---|---|---|---|---|---|---|
| Zn | 1.055 | Pb | 0.575 | Ni | 0.006 | Cd | 0.046 |
| As | 0.003 | Hg | 0.002 | | | | |

Reagent:
Quantity: 190 kg by ton of residues
Composition: $[CaO]_3]Al_2O_3]$: 21% $[CaO]_{12}]Al_2O_3]_7$: 79% CaO: 0%
Coating binding agent (kg by ton of residues):
Portland cement: 350
Leaching results after 28 days' hardening:
Soluble fraction: 2.1% of the dry waste
Chloride: 4 g by kg of dry waste
Heavy metals and arsenic: less than the detection threshold of the instrument.

We claim:

1. A method of treating urban waste incineration residues, in a finely divided form, comprising the steps of:

a) homogenizing the residues to be treated;

b) chemically analyzing the composition of said homogenized residues to determine at least the calcium and soluble salts content thereof;

c) mixing said residues with water and a reagent containing a mixture of active alumina or compounds sufficient to release active alumina and lime in preset proportions determined in relation to the chemical analysis of the residues, in order to generate complex aluminates, wherein the active alumina of said reagent is in excess of that needed to generate said complex aluminates;

d) setting the mixture so as to harden.

2. Treatment method according to claim 1, characterised in that the reagent contains $[CaO]_3]Al_2O_3]$.

3. Treatment method according to claim 1, characterised in that the reagent contains $[CaO]_{12}]Al_2O_3]_7$.

4. Treatment method according to claim 1, characterised in that the reagent contains both $[CaO]_3]Al_2O_3$ ]and $[CaO]_{12}]Al_2O_3]_7$.

5. Treatment method according to claim 1, characterised in that, during stage b), at least some of the chlorides, sulphates, carbonates and nitrates are analysed.

6. Treatment method according to claim 1, characterised in that the excess of active alumina is comprised between 0 and 20%.

7. Treatment method according to claim 1, characterised in that, after stage d):

e) the granulometry of the solid obtained is adapted in order to produce a granulate;

f) the granulate is mixed to a binding agent, in order to form a solid, in which the granulate is embedded.

8. Treatment method according to claim 7, characterised in that the binding agent is a hydraulic one.

9. Treatment method according to claim 8, characterised in that the binding agent is a Portland cement.

10. Treatment method according to claim 7, characterised in that the granulate/binding agent mixture is shaped up before solidification.

11. Treatment method according to claim 7, characterised in that the granulate/binding agent mixture is pressed.

12. Treatment method according to claim 7, characterised in that the granulate/binding agent mixture is vibrated.

13. Products obtained by implementing the process according to any of the claim 1.

14. A method for treating urban waste incineration residues comprising the steps of:

(a) homogenizing the residues to form homogenized residues;

(b) analyzing the homogenized residues to determine at least the calcium content or soluble salt content of the residues;

(c) mixing the residues with water and a reagent containing compounds capable of forming complex aluminates to form a mixture wherein the compounds are in an amount in stoichiometric excess of that needed for the formation of said complex aluminates; and (d) reacting the mixture to form complex aluminates and thereby harden the residues.

15. The method as recited in claim 14, wherein the reagent comprises $[CaO]_{12}[Al_2O_3]_7$.

16. The method as recited in claim 14, wherein the reagent comprises $[CaO]_3[Al_2O_3]$.

17. The method as recited in claim 14, wherein the reagent comprises $[CaO]_3[Al_2O_3]$ and $[CaO]_{12}[Al_2O_3]_7$.

18. The method as recited in claim 14, wherein the reagent is added at a weight excess between 0 and 20%.

19. The method as recited in claim 14, wherein maximum fixation of the soluble salts in the form of aluminates is achieved.

20. The method as recited in claim 14, wherein lime is added with the water and reagent to the mixture of step (c).

* * * * *